(12) United States Patent
Quan et al.

(10) Patent No.: US 10,897,715 B2
(45) Date of Patent: Jan. 19, 2021

(54) COMMUNICATION PROCESSING METHOD AND APPARATUS IN TIGHT COUPLING BETWEEN LONG-TERM EVOLUTION AND 5G

(71) Applicant: China Academy of Telecommunications Technology, Beijing (CN)

(72) Inventors: Haiyang Quan, Beijing (CN); Chandrika Kumudinie Worrall, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 33 days.

(21) Appl. No.: 16/313,067

(22) PCT Filed: May 11, 2017

(86) PCT No.: PCT/CN2017/083981
§ 371 (c)(1),
(2) Date: Dec. 24, 2018

(87) PCT Pub. No.: WO2017/219783
PCT Pub. Date: Dec. 28, 2017

(65) Prior Publication Data
US 2019/0230515 A1    Jul. 25, 2019

(30) Foreign Application Priority Data

Jun. 24, 2016 (CN) .......................... 2016 1 0474434

(51) Int. Cl.
*H04W 16/18* (2009.01)
*H04W 24/10* (2009.01)
(Continued)

(52) U.S. Cl.
CPC .......... *H04W 16/18* (2013.01); *H04B 17/327* (2015.01); *H04W 24/08* (2013.01);
(Continued)

(58) Field of Classification Search
None
See application file for complete search history.

(56) References Cited

U.S. PATENT DOCUMENTS

2012/0269095 A1  10/2012  Dalsgaard et al.
2017/0208494 A1* 7/2017  Moon ................... H04L 5/0048
(Continued)

FOREIGN PATENT DOCUMENTS

CN      102104921 A    6/2011
CN      102958091 A    3/2013
(Continued)

OTHER PUBLICATIONS

Gatt, "Control plane for support of tight interworking between 5G NR and LTE", 3GPP TSG RAN WG2 Meeting #94, R2-163467, Nanjing, China, May 23-27, 2016.
(Continued)

*Primary Examiner* — Chi H Pham
*Assistant Examiner* — Vladislav Y Agureyev
(74) *Attorney, Agent, or Firm* — Kilpatrick Townsend & Stockton, LLP

(57) ABSTRACT

Disclosed in embodiments of the present application are a communication processing method and apparatus in the tight coupling between long-term evolution and 5G. The method comprises: in the communication in the tight coupling between long-term evolution and 5G, after a base station side determines that a terminal is in the coverage of a 5G network, requesting measurement configurations of the 5G network from a node of the 5G network; after the measurement configurations sent by the node in the 5G network are
(Continued)

501 — Request a 5G network node for measurement configuration of the 5G network upon determining that a UE is covered by the 5G network 502 — Forward the measurement configuration transmitted by the 5G network node to the UE upon reception of the measurement configuration

US 10,897,715 B2
Page 2 received, forwarding the measurement configuration to the terminal; receiving, on the terminal side, the measurement configurations sent by the node of the 5G network and forwarded by the LTE base station side; performing signal processing according to the measurement configurations; receiving, on the node of the 5G network, the 5G network measurement configuration request sent by the LTE base station side; sending the measurement configurations to the LTE base station side; and performing signal processing according to the measurement configurations. By using the present application, the 5G measurement is executed more specifically, related signaling overheads can be reduced, and accordingly a solution in which the network side determines whether a 5G secondary base station and a carrier need to be added.

14 Claims, 7 Drawing Sheets

(51) Int. Cl.
  *H04W 24/08* (2009.01)
  *H04B 17/327* (2015.01)
  *H04W 76/15* (2018.01)
  *H04W 36/00* (2009.01)

(52) U.S. Cl.
  CPC ........... *H04W 24/10* (2013.01); *H04W 76/15* (2018.02); *H04W 36/0083* (2013.01)

(56) References Cited

U.S. PATENT DOCUMENTS

| | | | | |
|---|---|---|---|---|
| 2018/0049214 A1* | 2/2018 | Kubota | .................. | H04W 36/08 |
| 2018/0199220 A1* | 7/2018 | Reial | .................. | H04W 36/0088 |
| 2018/0219667 A1* | 8/2018 | Zhao | ...................... | H04L 5/0082 |
| 2018/0279376 A1* | 9/2018 | Dinan | ................. | H04W 74/0833 |
| 2018/0279406 A1* | 9/2018 | Agarwal | ............... | H04W 72/08 |
| 2018/0324663 A1* | 11/2018 | Park | .................. | H04W 36/0069 |
| 2018/0324889 A1* | 11/2018 | Babaei | .................. | H04L 5/0042 |
| 2018/0332659 A1* | 11/2018 | Hwang | .................. | H04W 88/06 |
| 2019/0028170 A1* | 1/2019 | Zhang | .................. | H04B 7/088 |
| 2019/0075478 A1* | 3/2019 | Lunden | .................. | H04W 24/10 |
| 2019/0098640 A1* | 3/2019 | Holakouei | ............ | H04L 1/1825 |
| 2019/0123864 A1* | 4/2019 | Zhang | .................. | H04B 7/0695 |
| 2019/0132896 A1* | 5/2019 | Kusashima | ........... | H04W 76/15 |
| 2019/0159051 A1* | 5/2019 | Takahashi | ............. | H04W 24/10 |
| 2019/0208474 A1* | 7/2019 | Ali | .................... | H04W 52/0206 |
| 2019/0223216 A1* | 7/2019 | Siomina | ................ | H04L 1/0026 |
| 2019/0246286 A1* | 8/2019 | Henttonen | ............ | H04W 72/04 |
| 2019/0268814 A1* | 8/2019 | Hannu | .............. | H04W 36/0069 |
| 2019/0297662 A1* | 9/2019 | Palat | ...................... | H04W 76/15 |
| 2019/0306759 A1* | 10/2019 | Berggren | .......... | H04W 52/0229 |
| 2019/0342148 A1* | 11/2019 | Hong | ..................... | H04W 76/15 |
| 2019/0357199 A1* | 11/2019 | Ali | ........................... | H04L 5/001 |
| 2019/0364601 A1* | 11/2019 | Kazmi | .................. | H04W 16/26 |
| 2019/0387424 A1* | 12/2019 | Yiu | .................... | H04W 36/0069 |
| 2020/0053809 A1* | 2/2020 | Axelsson | .......... | H04W 12/0013 |
| 2020/0059985 A1* | 2/2020 | Henttonen | ............ | H04W 76/15 |
| 2020/0092901 A1* | 3/2020 | Barabell | ........... | H04W 72/1263 |

FOREIGN PATENT DOCUMENTS

| | | |
|---|---|---|
| CN | 103546919 A | 1/2014 |
| CN | 103974317 A | 8/2014 |
| EP | 2733982 A1 | 5/2014 |
| WO | 2018037333 A1 | 3/2018 |

OTHER PUBLICATIONS

"Control Plane Aspects for Interworking between NR and LTE", InterDigital Communications, 3GPP TSG-RAN WG2 #93bis, R2-162785, Dubrovnik, Croatia, Apr. 11-15, 2016, 5 pages.

CATT: "RRC/RRM for LTE and NR interworking", 3GPP Draft; R2-163465-RRC and RRM for Interworking, 3rd Generation Partnership Project (3GPP), Mobile Competence Centre ; 650, Route Des Lucioles ; F-06921 Sophia-Antipolis Cedex ; France, vol. RAN WG2, No. Nanjing, China; May 23, 2016-May 27, 2016, May 22, 2016 (May 22, 2016), XP051104964, 3 pages.

Intel Corporation: "RRC aspects for 1-15 LTE-NR interworking", 3GPP Draft; R2-163587, 3rd Generation Partnership Project (3GPP), Mobile Competence Centre ; 650 , Route Des Lucioles ; F-06921 Sophia-Antipolis Cedex; France vol. RAN WG2, No. Nanjing, China; May 23, 2016-May 27, 2016, May 22, 2016 (May 22, 2016), XP051105036, 5 pages.

ZTE: "Discussion on control plane for the DC based LTE/NR tight interworking", 3GPP Draft, R2-163741 Discussion on Control Plane for the DC Based LTE NR Tight Interworking, 3rd Generation Partnership Project (3GPP), Mobile Competence Centre ; 650, Route Des Lucioles ; F-06921 SO vol. RAN WG2, No. Nanjing, China; May 23, 2016-May 27, 2016, May 22, 2016 (May 22, 2016), XP051105152.

Nokia Alcatel-Lucent Shanghai Bell: "Meausrement coordination in LTE/NR tight interworking", 3GPP Draft; R2-168118 Measurement Coordination in LTE-NR Tight Interworking, 3rd Generation Partnership Project (3GPP), Mobile Competence Centre ; 650, Route Des Lucioles ; F-06921 Sophia-Antipolis CE vol. RAN WG2, No. Reno, USA; Nov. 14, 2016-Nov. 18, 2016, Nov. 13, 2016 (Nov. 13, 2016), XP051177809, 6 pages.

* cited by examiner

COMMUNICATION PROCESSING METHOD AND APPARATUS IN TIGHT COUPLING BETWEEN LONG-TERM EVOLUTION AND 5G

This application is a National Stage of International Application No. PCT/CN2017/083981, filed May 11, 2017, which claims priority to Chinese Patent Application No. 201610474434.4, filed with the Chinese Patent Office on Jun. 24, 2016, and entitled "Method and apparatus for communication in Long Term Evolution (LTE) and 5G tight interworking", which is hereby incorporated by reference in its entirety.

FIELD

The present application relates to the field of wireless communications, and particularly to a method and apparatus for communication across tightly inter-working Long Term Evolution (LTE) and 5G systems.

BACKGROUND

FIG. 1 is a schematic network architectural diagram of an Evolution-Universal Terrestrial Radio Access Network (E-UTRAN), and as shown in FIG. 1, the E-UTRAN includes evolved Node B (eNBs). Each eNB functions as an access network, and communicates with a User Equipment (UE) via an air interface. There are both a control-plane connection and a user-plane connection between the UE and the eNB. Each UE attached to the network is served by a Mobility Management Entity (MME), and the MME is connected with a corresponding eNB via an S1-MME interface. The S1-MME interface provides the UE with a control-plane service including mobility management and bearer management functions.

A Serving Gateway (S-GW) is connected with each corresponding eNB via an S1-U interface, and each UE attached to the network is served by a corresponding S-GW. The S1-U interface provides the UE with a user-plane service, and user-plane data of the UE are transmitted between the S-GW and the eNB over an S1-U bearer.

FIG. 2 is a schematic architectural diagram of an LTE dual-connectivity control plane, and as shown in FIG. 2, dual connectivity is supported in an LTE system, where a signaling of a Secondary eNB (SeNB) is exchanged via an X2 interface, and a Master eNB (MeNB) communicates with a UE.

With dual connectivity in the existing LTE system, a cell on an eNB which may become an SeNB is configured to the UE as an adjacent cell to be measured, the UE measures it, and the LTE MeNB decides whether to configure the UE with the cell on the corresponding eNB as a serving cell of the UE, according to a measurement result of the UE. After the LTE MeNB and SeNB negotiate about a resource, the MeNB transmits configuration of the SeNB to the UE. In this architecture, the MeNB decides whether to serve the UE in the cell of the SeNB, according to the measurement by the UE, and a service demand of the UE. The SeNB can provide the MeNB with the corresponding configuration of the cell on the SeNB, and the MeNB further configures the UE with it.

FIG. 3 is a schematic architectural diagram of LTE and 5G tight interworking, and as shown in FIG. 3, the LTE system is a master base station, and a node in a 5G network is a secondary base station in the scenario of the LTE and 5G tight interworking.

A drawback in the prior art lies in that a secondary base station is added to the same system in the LTE dual-connectivity mode, and there are operations across the systems in the new scenario, but there has been absent so far in the prior art a technical solution to deciding at the network side whether to add a 5G secondary base station and a 5G carrier.

SUMMARY

The application provides a method and apparatus for communication in LTE and 5G tight interworking so as to enable the network side to decide whether to add a 5G secondary base station and a 5G carrier.

An embodiment of the application provides a method for communication in LTE and 5G tight interworking. The method includes: requesting a 5G network node for measurement configuration of a 5G network upon determining that a UE is covered by the 5G network; and upon reception of the measurement configuration transmitted by the 5G network node, forwarding the measurement configuration to the UE.

Optionally it is determined that the UE is covered by the 5G network, according to a measurement result of a carrier RSSI in the 5G network reported by the UE.

Optionally before it is determined that the UE is covered by the 5G network, the method further includes: configuring the UE to measure the carrier RSSI in the 5G network after it is determined that the UE is capable of communication over the 5G network.

Optionally the method further includes: forwarding a measurement result, on the 5G network, of the UE to the 5G network node upon reception of the measurement result.

An embodiment of the application provides a method for communication in LTE and 5G tight interworking. The method includes: receiving measurement configuration, transmitted by a 5G network node, forwarded by the LTE eNB side; and processing a signal of a 5G network according to the measurement configuration.

Optionally processing the signal of the 5G network according to the measurement configuration includes: transmitting the signal of the 5G network according to the measurement configuration; and/or detecting and measuring the signal of the 5G network according to the measurement configuration.

Optionally after the signal of the 5G network is detected and measured according to the measurement configuration, the method further includes: reporting a measurement result of the detection and the measurement to the LTE eNB side.

Optionally the method further includes: reporting a measurement result of a carrier RSSI in the 5G network to the LTE eNB side.

Optionally the measurement result of the carrier RSSI in the 5G network reported to the LTE eNB side is a measurement result of the carrier RSSI measured in the 5G network according to configuration of the LTE eNB side.

Optionally the method further includes: receiving related configuration, transmitted by the 5G network node, forwarded by the LTE eNB side; and communicating with the 5G network node according to the related configuration.

An embodiment of the application provides a method for communication in LTE and 5G tight interworking. The method includes: receiving a request, transmitted by the LTE eNB side, for measurement configuration of a 5G network; transmitting the measurement configuration to the LTE eNB side; and processing a signal according to the measurement configuration.

Optionally processing the signal according to the measurement configuration includes: measuring a signal transmitted to the 5G network according to the measurement configuration; and/or transmitting a signal of the 5G network according to the measurement configuration.

Optionally the method further includes: configuring a resource for communicating with a UE transmitting the signal to the 5G network, according to a measurement result of measuring the signal transmitted to the 5G network according to the measurement configuration; and/or configuring a resource for communicating with a UE measuring the signal of the 5G network transmitted according to the measurement configuration, according to a measurement result, of measuring the signal, forwarded by the LTE eNB side.

Optionally the method further includes: transmitting related configuration of the resource for communicating to the LTE eNB side.

Optionally the method further includes: communicating with the UE according to the related configuration.

An embodiment of the application provides an apparatus for communication in LTE and 5G tight interworking. The apparatus includes: a measurement configuration request transmitting module configured to request a 5G network node for measurement configuration of a 5G network upon determining that a UE is covered by the 5G network; and a measurement configuration forwarding module configured, upon reception of the measurement configuration transmitted by the 5G network node, to forward the measurement configuration to the UE.

Optionally the measurement configuration request transmitting module is further configured to determine that the UE is covered by the 5G network, according to a measurement result of a carrier RSSI in the 5G network reported by the UE.

Optionally the apparatus further includes: a measurement configuring module configured to configure the UE to measure the carrier RSSI in the 5G network before it is determined that the UE is covered by the 5G network, and after it is determined that the UE is capable of communication over the 5G network.

Optionally the apparatus further includes: a measurement result forwarding module configured to forward a measurement result, on the 5G network, of the UE to the 5G network node upon reception of the measurement result.

An embodiment of the application provides an apparatus for communication in LTE and 5G tight interworking. The apparatus includes: a measurement configuration receiving module configured to receive measurement configuration, transmitted by a 5G network node, forwarded by the LTE eNB side; and a UE signal processing module configured to process a signal of a 5G network according to the measurement configuration.

Optionally the UE signal processing module includes a UE transmitting unit and/or a UE measuring unit, wherein: the UE transmitting unit is configured to transmit the signal of the 5G network according to the measurement configuration; and the UE measuring unit is configured to detect and measure the signal of the 5G network according to the measurement configuration.

Optionally the apparatus further includes: a measurement result reporting module configured, after the signal of the 5G network is detected and measured according to the measurement configuration, to report a measurement result of the detection and the measurement to the LTE eNB side.

Optionally the apparatus further includes: an RSSI reporting module configured to report a measurement result of a carrier RSSI in the 5G network to the LTE eNB side.

Optionally the RSSI reporting module is further configured to report the measurement result of the carrier RSSI measured in the 5G network according to configuration of the LTE eNB side.

Optionally the apparatus further includes: a UE communicating module configured to receive related configuration, transmitted by the 5G network node, forwarded by the LTE eNB side; and to communicate with the 5G network node according to the related configuration.

An embodiment of the application provides an apparatus for communication in LTE and 5G tight interworking. The apparatus includes: a measurement configuration request receiving module configured to receive a request, transmitted by the LTE eNB side, for measurement configuration of a 5G network; a measurement configuration transmitting module configured to transmit the measurement configuration to the LTE eNB side; and a 5G signal processing module configured to process a signal according to the measurement configuration.

Optionally the 5G signal processing module includes a 5G transmitting unit and/or a 5G measuring unit, wherein: the 5G measuring unit is configured to measure a signal transmitted to the 5G network according to the measurement configuration; and the 5G transmitting unit is configured to transmit a signal of the 5G network according to the measurement configuration.

Optionally the apparatus further includes: a configuring module configured to configure a resource for communicating with a UE transmitting the signal to the 5G network, according to a measurement result of measuring the signal transmitted to the 5G network according to the measurement configuration; and/or to configure a resource for communicating with a UE measuring the signal of the 5G network transmitted according to the measurement configuration, according to a measurement result, of measuring the signal, forwarded by the LTE eNB side.

Optionally the configuring module is further configured to transmit related configuration of the resource for communicating to the LTE eNB side.

Optionally the apparatus further includes: a 5G communication module configured to communicate with the UE according to the related configuration.

An embodiment of the application provides an apparatus for communication in LTE and 5G tight interworking. The apparatus includes: a processor configured to read program in a memory and perform the operations of: processing a signal of a 5G network according to measurement configuration; and a transceiver configured to receive and transmit data under the control of the processor, and perform the operations of: receiving the measurement configuration, transmitted by a 5G network node, forwarded by the LTE eNB side.

Optionally processing the signal of the 5G network according to the measurement configuration includes: transmitting the signal of the 5G network according to the measurement configuration; and/or detecting and measuring the signal of the 5G network according to the measurement configuration.

Optionally after the signal of the 5G network is detected and measured according to the measurement configuration, the processor is further configured: to report a measurement result of the detection and the measurement to the LTE eNB side.

Optionally the processor is further configured: to report a measurement result of a carrier RSSI in the 5G network to the LTE eNB side.

Optionally the measurement result of the carrier RSSI in the 5G network reported to the LTE eNB side is a measurement result of the carrier RSSI measured in the 5G network according to configuration of the LTE eNB side.

Optionally the processor is further configured: to receive related configuration, transmitted by the 5G network node, forwarded by the LTE eNB side; and to communicate with the 5G network node according to the related configuration.

An embodiment of the application provides an apparatus for communication in LTE and 5G tight interworking. The apparatus includes: a processor configured to read program in a memory and perform the operations of: processing data as needed for a transceiver; and the transceiver configured to receive and transmit data under the control of the processor, and performing the operations of: requesting a 5G network node for measurement configuration of a 5G network upon determining that a UE is covered by the 5G network; and to forward the measurement configuration transmitted by the 5G network node to the UE upon reception of the measurement configuration.

Optionally the processor is configured to determine that the UE is covered by the 5G network, according to a measurement result of a carrier RSSI in the 5G network reported by the UE.

Optionally before it is determined that the UE is covered by the 5G network, the processor is further configured: to configure the UE to measure the carrier RSSI in the 5G network after it is determined that the UE is capable of communication over the 5G network.

Optionally the processor is further configured: to forward a measurement result, on the 5G network, of the UE to the 5G network node upon reception of the measurement result.

An embodiment of the application provides an apparatus for communication in LTE and 5G tight interworking. The apparatus includes: a processor configured to read program in a memory and perform the operations of: processing a signal according to measurement configuration transmitted to the LTE eNB side; and a transceiver configured to receive and transmit data under the control of the processor, and performing the operations of: receiving a request, transmitted by the LTE eNB side, for the measurement configuration of a 5G network; and transmitting the measurement configuration to the LTE eNB side.

Optionally the processor configured to process the signal according to the measurement configuration is configured: to measure a signal transmitted to the 5G network according to the measurement configuration; and/or to transmit a signal of the 5G network according to the measurement configuration.

Optionally the processor is further configured: to configure a resource for communicating with a UE transmitting the signal to the 5G network, according to a measurement result of measuring the signal transmitted to the 5G network according to the measurement configuration; and/or to configure a resource for communicating with a UE measuring the signal of the 5G network transmitted according to the measurement configuration, according to a measurement result, of measuring the signal, forwarded by the LTE eNB side.

Optionally the processor is further configured: to transmit related configuration of the resource for communicating to the LTE eNB side.

Optionally the processor is further configured: to communicate with the UE according to the related configuration.

Advantageous effects of the application are as follows.

In the technical solutions according to the embodiments of the application, in the methods and apparatus for communication in LTE and 5G tight interworking, the LTE eNB side requests the 5G network node for the measurement configuration of the 5G network upon determining that the UE is covered by the 5G network, and forwards the measurement configuration transmitted by the 5G network node upon reception of the measurement configuration.

The UE side receives the measurement configuration, transmitted by the 5G network node, forwarded by the LTE eNB side, and processes a signal of the 5G network according to the measurement configuration.

The 5G network node receives the request, for the measurement configuration of the 5G network, transmitted by the LTE eNB side, transmits the measurement configuration to the LTE eNB side, and processes the signal according to the measurement configuration.

Apparently after it is determined that the UE is covered by the 5G network, a finer and more pertinent 5G measurement is further made, so a related signaling overhead can be lowered; and with the solutions above, there is provided a solution to deciding at the network side whether to add a 5G secondary base station and a 5G carrier.

BRIEF DESCRIPTION OF THE DRAWINGS

The drawings to be described below are intended to provide further understanding of the application, and constitute a part of the application, and exemplary embodiments of the application, and the description thereof are intended to illustrate the application, but not to limit the application unduly. In the drawings.

DETAILED DESCRIPTION

Figure 1:
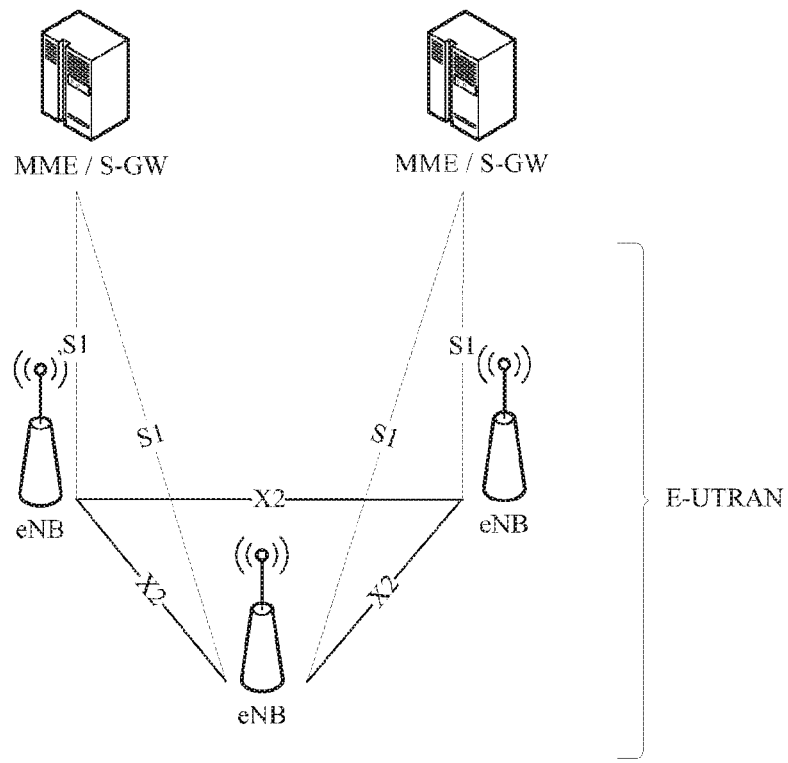
FIG. 1 is a schematic network architectural diagram of the E-UTRAN in the prior art.
Figure 2:
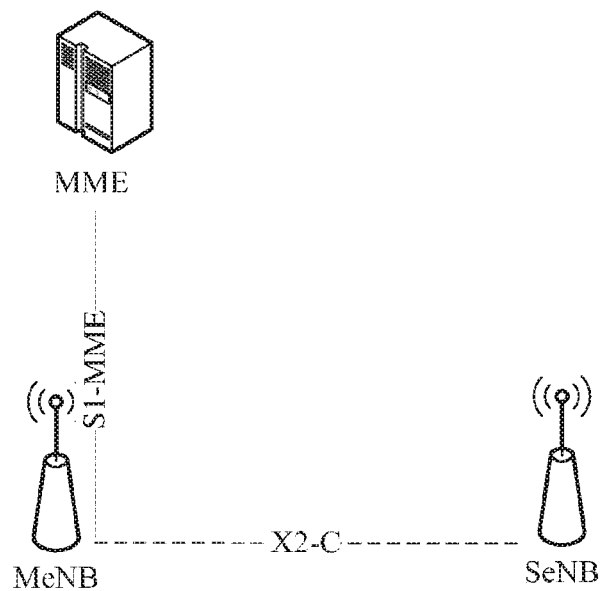
FIG. 2 is a schematic architectural diagram of the LTE dual-connectivity control plane in the prior art.
Figure 3:
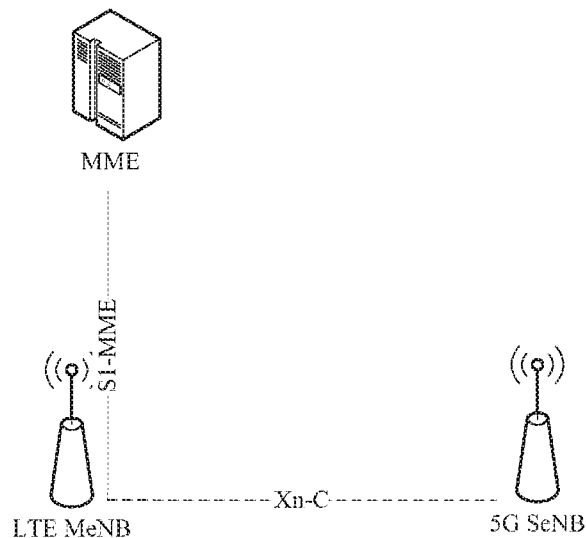
FIG. 3 is a schematic architectural diagram of the LTE and 5G tight interworking in the prior art.

Tight inter-working of an LTE system and a 5G system shall be supported as demanded and targeted for the 5G system. In a typical scenario of early deployment, a core network is an LTE core network, a 5G node at the access network side is connected with an LTE eNB, the LTE eNB is a Master eNB (MeNB), and the 5G network node is a Secondary eNB (SeNB). The LTE eNB can decide whether to enable the 5G network node to also serve some UE. However in this scenario, how the LTE eNB selects a 5G node for the UE remains unaddressed. In view of this, the embodiments of the application provide a method and apparatus for communication in the LTE and 5G tight interworking so as to provide a solution to selecting a 5G transmitting and receiving node for a UE in an LTE and 5G dual-connectivity scenario.

In the solution, generally the LTE MeNB determines whether the UE is covered by 5G network, according to a coarse measurement, and further negotiates with the 5G network node about a further 5G related measurement, and the 5G network node determines the position of the UE, and provides a radio resource for serving the UE. Particularly as follows.

The LTE MeNB can determine that the UE is covered by the 5G network, according to a carrier Received Signal Strength Indicator (RSSI). It shall be noted that the LTE MeNB may not determine whether the UE is covered by the 5G network, only according to the RSSI, and since this implementation using the RSSI is simple and less complex, the RRSI has been exemplified here, but the LTE MeNB can alternatively determine whether the UE is covered by the 5G network, in another appropriate way, for example, according to positional information, and the determination has been made according to the carrier RSSI as described above only for the purpose of teaching those skilled in the art particularly how to put the application into practice, but this shall not suggest that the determination can only be made in this implementation, and in another implementation, the determination can be made as needed in practice.

The LTE MeNB negotiates with the 5G network node, and the 5G network node provides the measurement configuration, starts the 5G measurement, and further decides to allocate a 5G resource for the UE, according to a 5G measurement result.

Specific embodiments of the application will be described below with reference to the drawings.

In the following description, implementations at the UE side, the LTE eNB side, and the 5G network node side will be described respectively, and then an implementation in which the three parties cooperate will be further described for better understanding of an implementation of the embodiments of the application. This description shall not suggest that the three parties must cooperate for an implementation, or must operate separately for an implementation, but in fact, when the UE side, the LTE eNB side, and the 5G network node side operate separately, they can also address the respective problems at the UE side, the LTE eNB side, and the 5G network node side, although a better technical effect can be achieved when the three parties cooperate.

Figure 4:
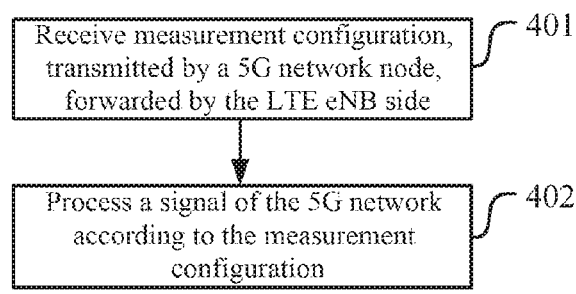
FIG. 4 is a schematic flow chart of a method for communication in the LTE and 5G tight interworking at the UE side according to an embodiment of the application.

FIG. 4 is a schematic flow chart of a method for communication in the LTE and 5G tight interworking at the UE side according to an embodiment of the application. The method can include the following steps.

The step 401 is to receive measurement configuration, transmitted from a 5G network node, forwarded by the LTE eNB side.

The step 402 is to process a signal of the 5G network according to the measurement configuration.

In an implementation, the signal of the 5G network can be processed according to the measurement configuration as follows.

The signal of the 5G network is transmitted according to the measurement configuration; and/or the signal of the 5G network is detected and measured according to the measurement configuration.

In an implementation, after the signal of the 5G network is detected and measured according to the measurement configuration, the method can further include: a measurement result of the detection and the measurement is reported to the LTE eNB side.

In an implementation, the method can further include: a measurement result of a carrier RSSI in the 5G network is reported to the LTE eNB side.

In an implementation, the measurement result of the carrier RSSI in the 5G network can be reported to the LTE eNB side by reporting the measurement result of the carrier RSSI in the 5G network according to configuration of the LTE eNB side.

In an implementation, the method can further include: receiving related configuration, transmitted by the 5G network node, forwarded by the LTE eNB side; and communicating with the 5G network node according to the related configuration.

Specifically the UE side operates as follows.

The UE side measures the 5G carrier RSSI according to the configuration of the LTE eNB, and reports the measurement result.

The UE side makes a 5G measurement, or transmits a 5G uplink dedicated signal, according to the 5G measurement configuration transmitted by the LTE eNB.

Figure 5:
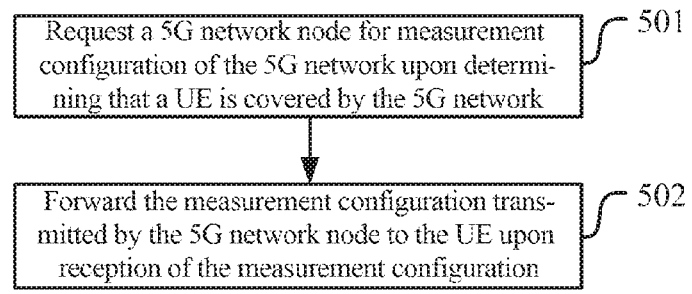
FIG. 5 is a schematic flow chart of a method for communication in the LTE and 5G tight interworking at the LTE eNB side according to an embodiment of the application.

FIG. 5 is a schematic flow chart of a method for communication in the LTE and 5G tight interworking at the LTE eNB side according to an embodiment of the application, and as illustrated, the method can include the following steps.

The step 501 is to request a 5G network node for measurement configuration of the 5G network upon determining that a UE is covered by the 5G network.

The step 502 is to forward the measurement configuration transmitted by the 5G network node to the UE upon reception of the measurement configuration.

In an implementation, it can be determined that the UE is covered by the 5G network, according to a measurement result of a carrier RSSI in the 5G network reported by the UE.

In an implementation, before it is determined that the UE is covered by the 5G network, the method can further include: configuring the UE to measure the carrier RSSI in the 5G network, upon determining that the UE is capable of communication over the 5G network.

In an implementation, the method can further include: forwarding a measurement result, on the 5G network, of the UE to the 5G network node upon reception of the measurement result.

Specifically the LTE eNB side operates as follows: upon determining that the UE is capable of communication over the 5G network, configuring the UE to measure the carrier RSSI in the 5G network; when determining that the UE is covered by the 5G network, according to the measurement result of the carrier RSSI in the 5G network reported by the UE, transmitting a message to the 5G network node to request for the 5G measurement configuration; receiving measurement configuration transmitted by the 5G network node and forwarding to the UE. If the LTE eNB receives the 5G measurement result of the UE, then the LTE eNB forwards the measurement result to the 5G network node.

Figure 6:
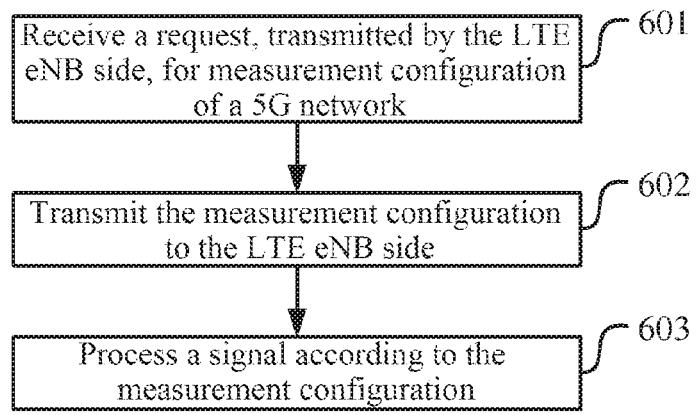
FIG. 6 is a schematic flow chart of a method for communication in the LTE and 5G tight interworking at the 5G network node side according to an embodiment of the application.

FIG. 6 is a schematic flow chart of a method for communication in the LTE and 5G tight interworking at the 5G network node side according to an embodiment of the application, and as illustrated, the method can include the following steps.

The step 601 is to receive a request, transmitted by the LTE eNB side, for measurement configuration of a 5G network.

The step 602 is to transmit the measurement configuration to the LTE eNB side.

The step 603 is to process a signal according to the measurement configuration.

In an implementation, the signal is processed according to the measurement configuration as follows: a signal transmitted to the 5G network is measured according to the measurement configuration; and/or a signal of the 5G network is transmitted according to the measurement configuration.

In an implementation, the method can further include the following steps.

A resource for communicating with a UE transmitting the signal to the 5G network is configured according to a measurement result of measuring the signal according to the measurement configuration; and/or a resource for communicating with a UE measuring the signal of the 5G network transmitted according to the measurement configuration is configured according to a measurement result, of measuring the signal, forwarded by the LTE eNB side.

In an implementation, the method can further include: transmitting related configuration of the resource for communicating to the LTE eNB side.

In an implementation, the method can further include: communicating with the UE according to the related configuration.

Specifically the 5G network node side operates as follows: transmitting the 5G measurement configuration to the LTE eNB upon reception of the request message transmitted by the LTE eNB; and allocating the 5G resource and configuration information for the UE according to the received measurement result of the UE, or measurement result of the 5G network side and transmitting to the LTE eNB.

Specifically the UE, the LTE eNB side, and the node in the 5G network cooperate in the following implementation.

Figure 7:
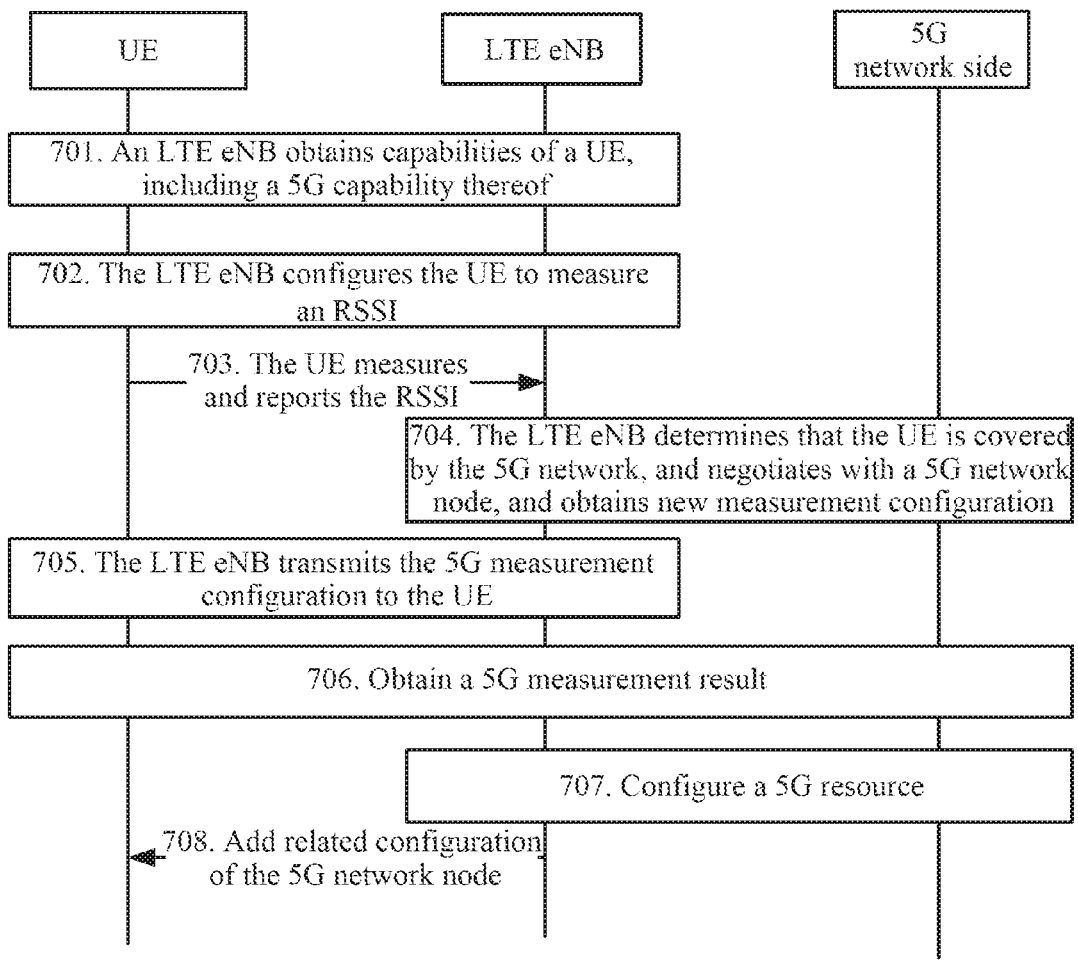
FIG. 7 is a schematic flow chart of a method for communication in the LTE and 5G tight interworking according to an embodiment of the application.

FIG. 7 is a schematic flow chart of a method for communication in the LTE and 5G tight interworking according to an embodiment of the application, and as illustrated, the method can include the following steps.

In the step 701, an LTE eNB obtains capabilities of a UE, including a 5G capability thereof.

In the step 702, the LTE eNB configures the UE to measure an RSSI.

In the step 703, the UE measures and reports the RSSI.

In the step 704, the LTE eNB determines that the UE is covered by the 5G network, and negotiates with the 5G network node, and obtains new measurement configuration.

In the step 705, the LTE eNB transmits the 5G measurement configuration to the UE.

In the step 706, a 5G measurement result is obtained.

In the step 707, a 5G resource is configured.

In the step 708, configuration of the 5G network node is added.

For better understanding of the specific implementation, embodiments thereof will be described below.

First Embodiment

Figure 8:
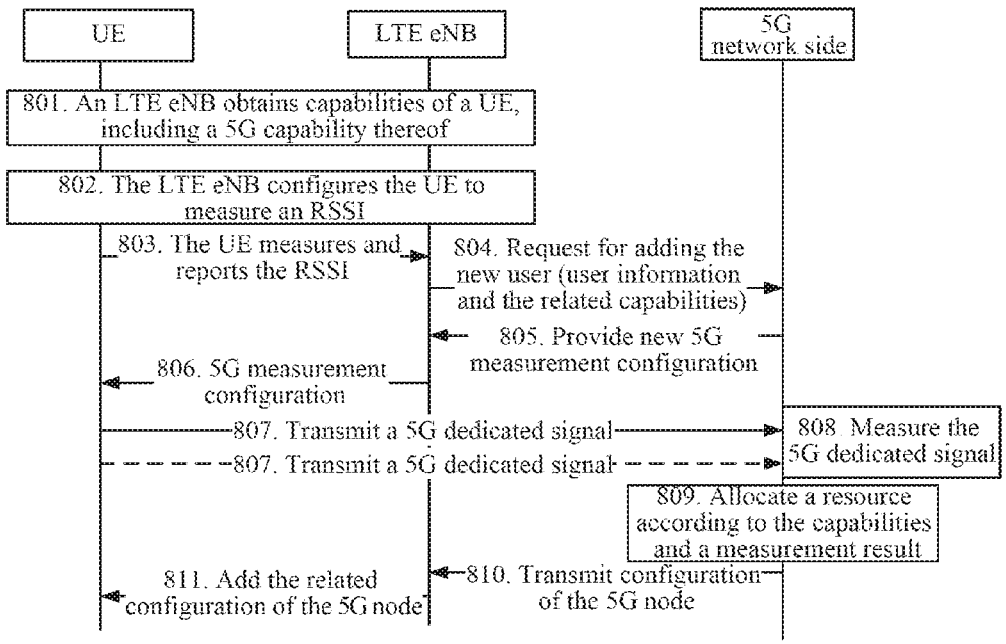
FIG. 8 is a schematic flow chart of a method for communication in the LTE and 5G tight interworking according to an embodiment of the application, where a UE transmits a signal, and a 5G network node measures it.

FIG. 8 is a schematic flow chart of a method for communication in the LTE and 5G tight interworking according to an embodiment of the application, where a UE transmits a signal, and a 5G network node measures it, and as illustrated, the method can include the following steps.

In the step 801, an LTE eNB obtains capabilities of a UE, including a 5G capability thereof.

In the step 802, the LTE eNB configures the UE to measure an RSSI.

In the step 803, the UE measures and reports the RSSI.

In the step 804, the LTE eNB requests a 5G network node for adding the new user.

Specifically the request can include user information and the related capabilities.

In the step 805, the 5G network node provides the LTE eNB with new 5G measurement configuration.

In the step 806, the LTE eNB forwards the 5G measurement configuration to the UE.

In the step 807, the UE transmits a 5G dedicated signal.

In the step 808, the 5G network node measures the dedicated signal.

In the step 809, the 5G network node allocates a resource according to the capabilities and a measurement result.

In the step 810, the 5G network node transmits related configuration of the 5G network node to the LTE eNB.

In the step 811, the LTE eNB requests the UE for adding the related configuration of the 5G network node.

In this embodiment, the UE transmits a signal, and the 5G network node measures it.

After the LTE eNB obtains the capabilities of the UE, the LTE eNB knows that the UE can support 5G network, so the LTE eNB configures the UE to measure an RSSI in the 5G frequency band supported by the UE, according to the supported 5G frequency band by the UE, and a deployment condition of 5G base stations. Upon reception of the measurement configuration, the UE makes a related 5G carrier RSSI measurement, and reports a measurement result to the LTE eNB. Upon reception of the measurement result of the RSSI, the LTE eNB determines that the UE has been covered by the 5G network node, according to the measurement result, so the LTE eNB negotiates with the corresponding 5G network node. The 5G network node can allocate a dedicated uplink reference signal and related configuration information for the UE, so that the UE transmits the corresponding signal to the 5G network node.

The LTE eNB forwards the measurement configuration transmitted by the 5G network node to the corresponding UE upon reception of the measurement configuration. The UE transmits the 5G signal according to the measurement configuration. The 5G network node also configures a lower layer to measure the signal, allocates the 5G resource for the UE according to a measurement result reported from the lower layer, and forwards the measurement result through the LTE eNB.

The UE can communicate directly with the 5G network node, be served by the 5G network node, and transmit user data, upon reception of the 5G-related configuration.

Second Embodiment

Figure 9:
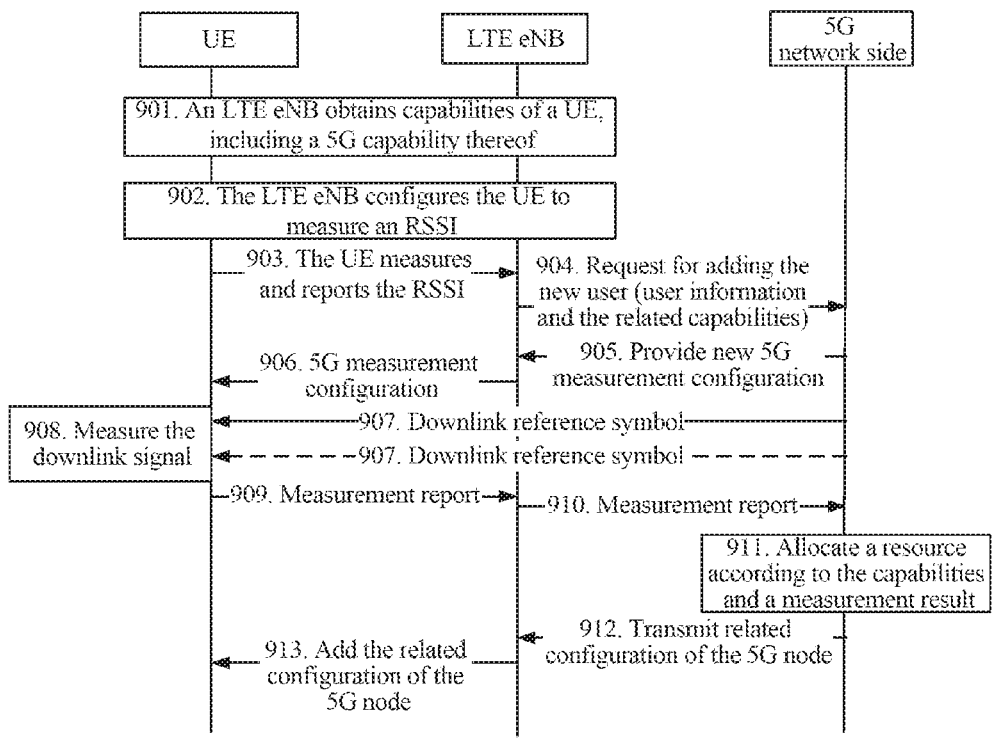
FIG. 9 is a schematic flow chart of a method for communication in the LTE and 5G tight interworking according to an embodiment of the application, where a 5G network node transmits a signal, and a UE measures.

FIG. 9 is a schematic flow chart of a method for communication in the LTE and 5G tight interworking according to an embodiment of the application, where a 5G network node transmits a signal, and a UE measures, and as illustrated, the method can include the following steps.

In the step 901, an LTE eNB obtains capabilities of a UE, including a 5G capability thereof.

In the step 902, the LTE eNB configures the UE to measure an RSSI.

In the step 903, the UE measures and reports the RSSI.

In the step 904, the LTE eNB requests a 5G network node for adding the new user.

Specifically the request can include user information and the related capabilities.

In the step 905, the 5G network node provides the LTE eNB with new 5G measurement configuration.

In the step 906, the LTE eNB forwards the 5G measurement configuration to the UE.

In the step 907, the 5G network node transmits a downlink reference symbol.

In the step 908, the UE measures the downlink signal.

In the step 909, the UE makes a measurement report to the LTE eNB.

In the step 910, the LTE eNB forwards the measurement report to the 5G network node.

In the step 911, the 5G network node allocates a resource according to the capabilities and a measurement result.

In the step 912, the 5G network node transmits related configuration of the 5G network node to the LTE eNB.

In the step 913, the LTE eNB requests the UE for adding the related configuration of the 5G network node.

In this embodiment, the 5G network node transmits a signal, and UE measures it.

After the LTE eNB obtains the capabilities of the UE, the LTE eNB knows that the UE can support the 5G network, so the LTE eNB configures the UE to measure an RSSI in the frequency band supported by the UE, according to the supported 5G frequency band by the UE, and a deployment condition of 5G base stations. Upon reception of the measurement configuration, the UE makes a related 5G carrier RSSI measurement, and reports a measurement result to the LTE eNB. Upon reception of the measurement result of the RSSI, the LTE eNB determines that the UE has been covered by the 5G network node, according to the measurement result, so the LTE eNB negotiates with the corresponding 5G network node.

The 5G network node configures the UE with a reference symbol of a Transmitter and Receiver Point (TRP), a reference symbol of a beam, or a reference symbol of a cell, to be possibly used, and related configuration information according to the capabilities of the UE, and the UE detects and measures the signal according to the related configuration, and reports a measurement result to the 5G network node through the LTE eNB. The 5G network node determines resource configuration at a lower layer according to the result reported by the UE, and forwards the resource configuration to the UE through the LTE eNB.

The UE can communicate directly with the 5G network node, be served by the 5G network node, and transmit user data, upon reception of the 5G-related configuration.

Based upon the same inventive idea, embodiments of the application further provide apparatuses for communication in the LTE and 5G tight interworking, and since these apparatuses address the problem under a similar principle to the methods above for communication in the LTE and 5G tight interworking, reference can be made to the implementations of the methods for implementations of these apparatuses, and a repeated description thereof will be omitted here.

Figure 10:
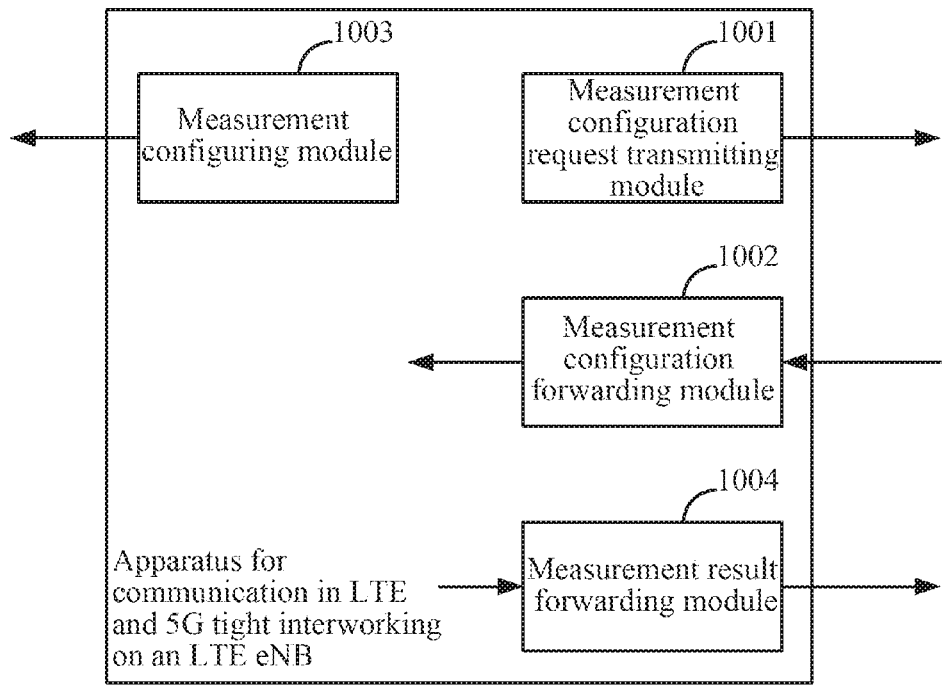
FIG. 10 is a schematic structural diagram of an apparatus for communication in the LTE and 5G tight interworking on an LTE eNB according to an embodiment of the application.

FIG. 10 is a schematic structural diagram of an apparatus for communication in LTE and 5G tight interworking on an LTE eNB according to an embodiment of the application, and as illustrated in FIG. 10, the apparatus can include the following modules.

A measurement configuration request transmitting module 1001 is configured to request a 5G network node for measurement configuration of a 5G network upon determining that a UE is covered by the 5G network.

A measurement configuration forwarding module 1002 is configured to forward the measurement configuration transmitted by the 5G network node to the UE upon reception of the measurement configuration.

In an implementation, the measurement configuration request transmitting module is further configured to determine that the UE is covered by the 5G network, according to a measurement result of a carrier RSSI in the 5G network reported by the UE.

In an implementation, the apparatus can further include the following module.

A measurement configuring module 1003 is configured to configure the UE to measure the carrier RSSI in the 5G network before it is determined that the UE is covered by the 5G network, and after it is determined that the UE is capable of communication over the 5G network.

In an implementation, the apparatus can further include the following module.

A measurement result forwarding module 1004 is configured to forward a measurement result, on the 5G network, of the UE to the 5G network node upon reception of the measurement result.

Figure 11:
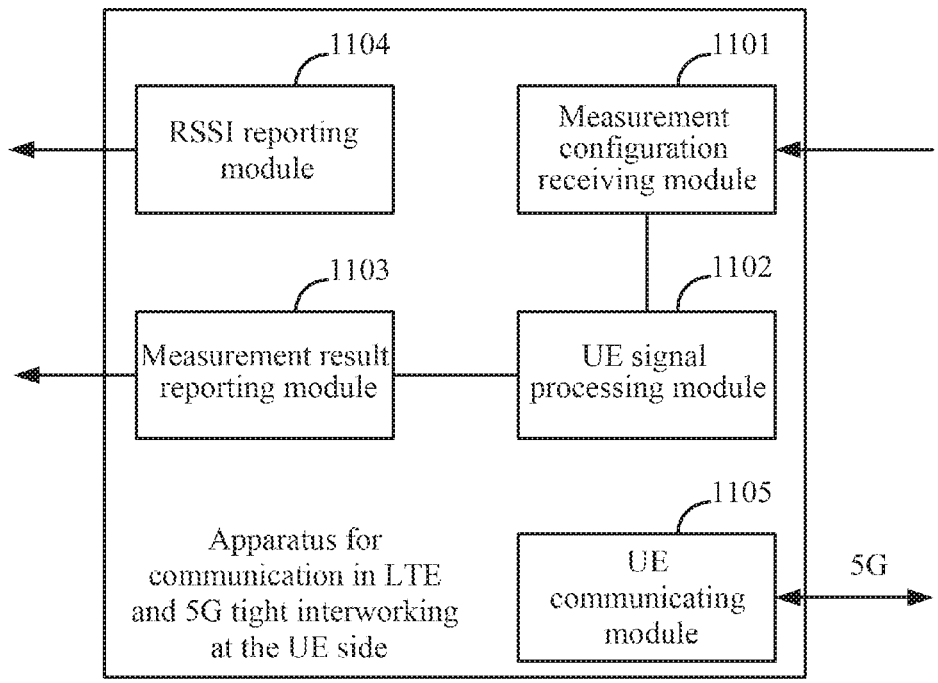
FIG. 11 is a schematic structural diagram of an apparatus for communication in the LTE and 5G tight interworking on an LTE eNB according to an embodiment of the application.

FIG. 11 is a schematic structural diagram of an apparatus for communication in LTE and 5G tight interworking at the UE side according to an embodiment of the application, and as illustrated, the apparatus can include the following modules.

A measurement configuration receiving module 1101 is configured to receive measurement configuration, transmitted by a 5G network node, forwarded by the LTE eNB side.

A UE signal processing module 1102 is configured to process a signal of the 5G network according to the measurement configuration.

In an implementation, the UE signal processing module can include a UE transmitting unit and/or a UE measuring unit.

The UE transmitting unit is configured to transmit the signal of the 5G network according to the measurement configuration.

The UE measuring unit is configured to detect and measure the signal of the 5G network according to the measurement configuration.

In an implementation, the apparatus can further include the following module.

A measurement result reporting module 1103 is configured, after the signal of the 5G network is detected and measured according to the measurement configuration, to report a measurement result of the detection and the measurement to the LTE eNB side.

In an implementation, the apparatus can further include the following module.

An RSSI reporting module 1104 is configured to report a measurement result of a carrier RSSI in the 5G network to the LTE eNB side.

In an implementation, the RSSI reporting module can be further configured to report the measurement result of the carrier RSSI in the 5G network according to configuration of the LTE eNB side.

In an implementation, the apparatus can further include the following module.

A UE communicating module 1105 is configured to receive related configuration, transmitted by the 5G network node, forwarded by the LTE eNB side; and to communicate with the 5G network node according to the related configuration.

Figure 12:
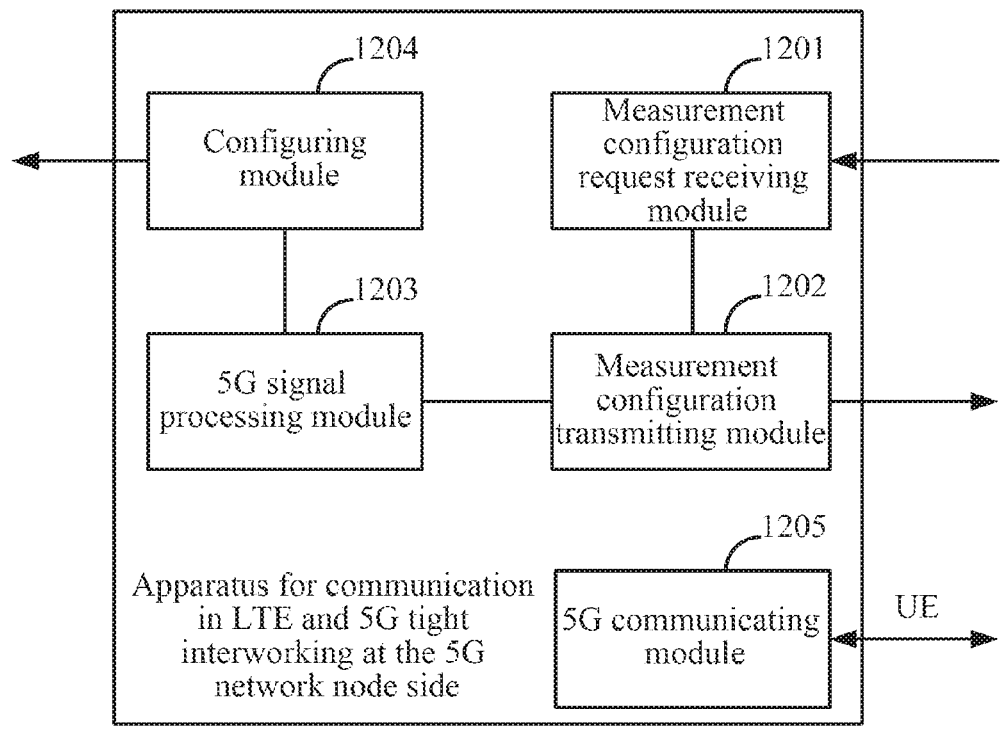
FIG. 12 is a schematic structural diagram of an apparatus for communication in the LTE and 5G tight interworking at the UE side according to an embodiment of the application.

FIG. 12 is a schematic structural diagram of an apparatus for communication in LTE and 5G tight interworking at the 5G network node side according to an embodiment of the application, and as illustrated, the apparatus can include the following modules.

A measurement configuration request receiving module 1201 is configured to receive a request, transmitted by the LTE eNB side, for measurement configuration of a 5G network.

A measurement configuration transmitting module 1202 is configured to transmit the measurement configuration to the LTE eNB side.

A 5G signal processing module 1203 is configured to process a signal according to the measurement configuration.

In an implementation, the 5G signal processing module includes a 5G transmitting unit and/or a 5G measuring unit.

The 5G measuring unit is configured to measure a signal transmitted to the 5G network according to the measurement configuration.

The 5G transmitting unit is configured to transmit a signal of the 5G network according to the measurement configuration.

In an implementation, the apparatus can further include the following module.

A configuring module 1204 is configured to configure a resource for communicating with a UE transmitting the signal to the 5G network, according to a measurement result of measuring the signal according to the measurement configuration; and/or to configure a resource for communicating with a UE measuring the signal of the 5G network transmitted according to the measurement configuration, according to a measurement result, of measuring the signal, forwarded by the LTE eNB side.

In an implementation, the configuring module can be further configured to transmit related configuration of the resource for communicating to the LTE eNB side.

In an implementation, the apparatus can further include the following module.

A 5G communication module 1205 is configured to communicate with the UE according to the related configuration.

For the sake of a convenient description, the respective components of the apparatuses above have been functionally described as respective modules or units. Of course, the functions of the respective modules or units can be performed in the same one or more pieces of software or hardware in an embodiment of the application.

The technical solutions according to the embodiments of the application can be implemented in the following embodiments.

Figure 13:
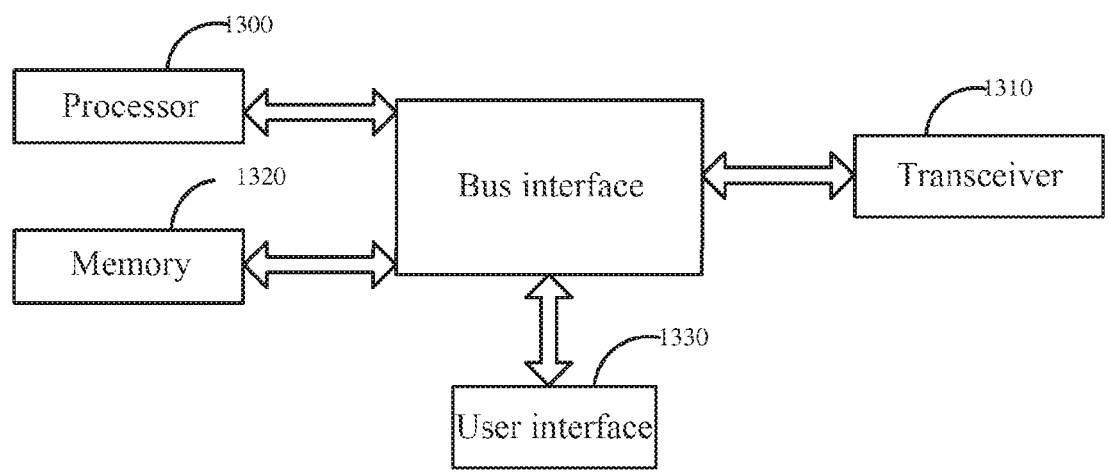
FIG. 13 is a schematic structural diagram of an apparatus for communication in the LTE and 5G tight interworking at the 5G network node side according to an embodiment of the application.

FIG. 13 is a schematic structural diagram of a UE according to an embodiment of the application, and as illustrated, the UE includes the followings.

A processor 1300 is configured to read program in a memory 1320 and perform the operation of: processing a signal of a 5G network according to measurement configuration.

A transceiver 1310 is configured to receive and transmit data under the control of the processor 1300, and perform the operation of: receiving the measurement configuration, transmitted by a 5G network node, forwarded by the LTE eNB side.

In an implementation, the processor configured to process the signal of the 5G network according to the measurement configuration is configured: to transmit the signal of the 5G network according to the measurement configuration; and/or to detect and measure the signal of the 5G network according to the measurement configuration.

In an implementation, after the signal of the 5G network is detected and measured according to the measurement configuration, the processor is further configured: to report a measurement result of the detection and the measurement to the LTE eNB side.

In an implementation, the processor is further configured: to report a measurement result of a carrier RSSI in the 5G network to the LTE eNB side.

In an implementation, the measurement result of the carrier RSSI in the 5G network reported to the LTE eNB side is a measurement result of the carrier RSSI measured in the 5G network according to configuration of the LTE eNB side.

In an implementation, the processor is further configured: to receive related configuration, transmitted by the 5G network node, forwarded by the LTE eNB side; and to communicate with the 5G network node according to the related configuration.

Here in FIG. 13, the bus architecture can include any number of interconnecting buses and bridges to link together various circuits including one or more processors represented by the processor 1300, and one or more memories represented by the memory 1320. The bus architecture can further link together various other circuits, e.g., a peripheral device, a manostat, a power management circuit, etc., all of which are well known in the art, so a further description thereof will be omitted in this context. The bus interface serves as an interface. The transceiver 1310 can be a number of elements, e.g., a transmitter and a receiver, which are units for communication with various other devices over a transmission medium. For different UEs, the user interface can be an interface via which desirable devices can be connected externally and internally, where the connected devices include but will not be limited to a keypad, a display, a loudspeaker, a microphone, a joystick, etc.

The processor 1300 is responsible for managing the bus architecture and performing normal processes, and the memory 1320 can store data for use by the processor 1300 in performing the operations.

Figure 14:
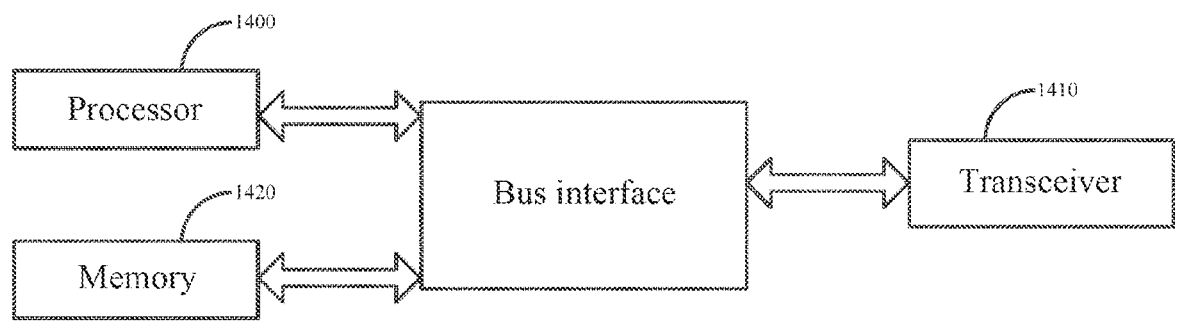
FIG. 14 is a schematic structural diagram of an LTE eNB according to an embodiment of the application.

FIG. 14 is a schematic structural diagram of an LTE eNB according to an embodiment of the application, and as illustrated, the LTE eNB includes the followings.

A processor 1400 is configured to read program in a memory 1420 and perform the operation of: processing data as needed for a transceiver.

The transceiver 1410 configured to receive and transmit data under the control of the processor 1400, and perform the operations of: requesting a 5G network node for measurement configuration of the 5G network upon determining that a UE is covered by a 5G network; and forwarding the measurement configuration transmitted by the 5G network node to the UE upon reception of the measurement configuration.

In an implementation, the processor is configured to determine that the UE is covered by the 5G network, according to a measurement result of a carrier RSSI in the 5G network reported by the UE.

In an implementation, before it is determined that the UE is covered by the 5G network, the processor is further configured: after it is determined that the UE is capable of communication over the 5G network, to configure the UE to measure the carrier RSSI in the 5G network.

In an implementation, the processor is further configured: to forward a measurement result, on the 5G network, of the UE to the 5G network node upon reception of the measurement result.

Here in FIG. 14, the bus architecture can include any number of interconnecting buses and bridges to link together various circuits including one or more processors represented by the processor 1400, and one or more memories represented by the memory 1420. The bus architecture can further link together various other circuits, e.g., a peripheral device, a manostat, a power management circuit, etc., all of which are well known in the art, so a further description thereof will be omitted in this context. The bus interface serves as an interface. The transceiver 1410 can be a number of elements, e.g., a transmitter and a receiver, which are units for communication with various other devices over a transmission medium. The processor 1400 is responsible for managing the bus architecture and performing normal processes, and the memory 1420 can store data for use by the processor 1400 in performing the operations.

Figure 15:
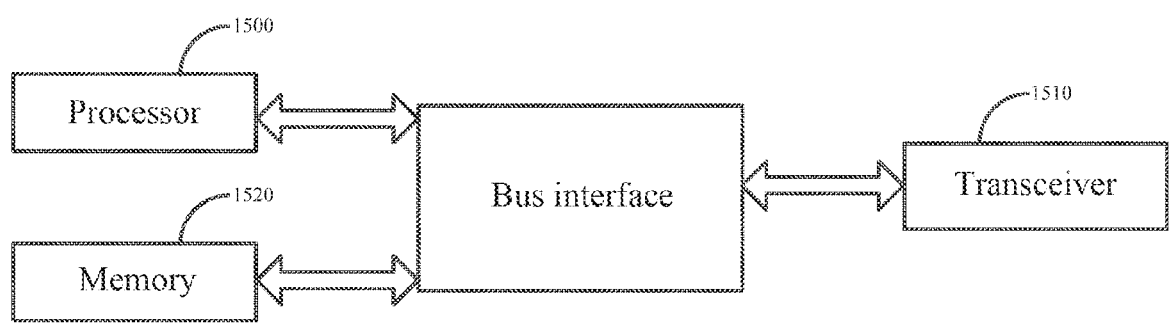
FIG. 15 is a schematic structural diagram of a 5G network node according to an embodiment of the application.

FIG. 15 is a schematic structural diagram of a 5G network node according to an embodiment of the application, and as illustrated, the 5G network node includes the followings.

A processor 1500 is configured to read program in a memory 1520 and perform the operation of: processing a signal according to measurement configuration transmitted to the LTE eNB side.

A transceiver 1510 configured to receive and transmit data under the control of the processor 1500, and perform the operations of: receiving a request, transmitted by the LTE eNB side, for the measurement configuration of a 5G network; and transmitting the measurement configuration to the LTE eNB side.

In an implementation, the processor configured to process the signal according to the measurement configuration is configured: to measure a signal transmitted to the 5G network according to the measurement configuration; and/or to transmit a signal of the 5G network according to the measurement configuration.

In an implementation, the processor is further configured: to configure a resource for communicating with a UE transmitting the signal to the 5G network, according to a measurement result of measuring the signal according to the measurement configuration; and/or to configure a resource for communicating with a UE measuring the signal of the 5G network transmitted according to the measurement configuration, according to a measurement result, of measuring the signal, forwarded by the LTE eNB side.

In an implementation, the processor is further configured: to transmit related configuration of the resource for communicating to the LTE eNB side.

In an implementation, the processor is further configured: to communicate with the UE according to the related configuration.

Here in FIG. 15, the bus architecture can include any number of interconnecting buses and bridges to link together various circuits including one or more processors represented by the processor 1500, and one or more memories represented by the memory 1520. The bus architecture can further link together various other circuits, e.g., a peripheral device, a manostat, a power management circuit, etc., all of which are well known in the art, so a further description thereof will be omitted in this context. The bus interface serves as an interface. The transceiver 1510 can be a number of elements, e.g., a transmitter and a receiver, which are units for communication with various other devices over a transmission medium. The processor 1500 is responsible for managing the bus architecture and performing normal processes, and the memory 1520 can store data for use by the processor 1500 in performing the operations.

In summary, the 5G network node in the is added and a resource is allocated, in two steps in the LTE and 5G inter-working scenario (also referred to as an LTE and 5G non-standalone scenario) in the technical solutions according to the embodiments of the application.

Firstly the LTE MeNB determines that the UE is covered by the 5G network, according to the carrier RSSI.

Secondly the LTE MeNB negotiates with the 5G network node, and the 5G network node provides the measurement configuration, makes a 5G measurement, and decides to allocate a 5G resource for the UE, according to a 5G measurement result.

The technical solutions according to the embodiments of the application propose a solution to support dual connectivity, and adding the 5G network node in the LTE and 5G non-standalone scenario. Advantages of the solution lie in that a RSSI is measured simply using a carrier signal strength without any repeated detection, so the implementation complexity of the UE can be lowered; and after it is determined that the UE is covered by the 5G network, a finer and more pertinent 5G measurement is further made, so a related signaling overhead can be lowered, and power consumption of the UE can be saved.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for communication in Long Term Evolution (LTE) and 5G tight interworking, the method comprising:
   configuring, by an LTE eNB, a UE to measure a carrier Received Signal Strength Indicator (RSSI) in a 5G network after the LTE eNB has determined that the UE is capable of communication over the 5G network;
   determining, by the LTE eNB, that the UE is covered by the 5G network, according to a measurement result of the carrier RSSI in the 5G network reported by the UE;
   requesting, by the LTE eNB, a 5G network node for measurement configuration of the 5G network upon determining that the UE is covered by the 5G network; and
   forwarding, by the LTE eNB, the measurement configuration to the UE upon reception of the measurement configuration transmitted by the 5G network node.

2. The method according to claim 1, wherein the method further comprises:
   forwarding a measurement result, on the 5G network, of the UE to the 5G network node upon reception of the measurement result.

3. An apparatus for communication in LTE and 5G tight interworking, the apparatus comprising a processor and a memory, wherein the processor is configured to read program codes in the memory to perform the method according to claim 1.

4. A method for communication in LTE and 5G tight interworking, the method comprising:
   performing, by a UE, a Received Signal Strength Indicator (RSSI) measurement of a carrier of a 5G network, according to the configuration of the LTE eNB side;
   reporting, by the UE, a measurement result of a carrier RSSI in a 5G network to a LTE eNB side;
   receiving, by the UE, measurement configuration, transmitted by a 5G network node, forwarded by the LTE eNB side; and
   processing, by the UE, a signal of the 5G network according to the measurement configuration.

5. The method according to claim 4, wherein processing the signal of the 5G network according to the measurement configuration comprises:
   transmitting the signal of the 5G network according to the measurement configuration; and/or
   detecting and measuring the signal of the 5G network according to the measurement configuration.

6. The method according to claim 5, wherein after the signal of the 5G network is detected and measured according to the measurement configuration, the method further comprises:
   reporting a measurement result of the detection and the measurement to the LTE eNB side.

7. The method according to claim 4, wherein the method further comprises:
   receiving related configuration, transmitted by the 5G network node, forwarded by the LTE eNB side; and
   communicating with the 5G network node according to the related configuration.

8. An apparatus for communication in LTE and 5G tight interworking, the apparatus comprising a processor and a memory, wherein the processor is configured to read program codes in the memory to perform the method according to claim 4.

9. A method for communication in LTE and 5G tight interworking, the method comprising:
   receiving, by a 5G network node, a request, transmitted by the LTE eNB side, for measurement configuration of a 5G network;
   transmitting, by the 5G network node, the measurement configuration to the LTE eNB side; and
   measuring, by the 5G network node, a signal transmitted to the 5G network according to the measurement configuration.

10. The method according to claim 9, further comprising:
    transmitting a signal of the 5G network according to the measurement configuration.

11. The method according to claim 10, wherein the method further comprises:
    configuring a resource for communicating with a UE transmitting the signal to the 5G network, according to a measurement result of measuring the signal transmitted to the 5G network according to the measurement configuration; and/or
    configuring a resource for communicating with a UE measuring the signal of the 5G network transmitted according to the measurement configuration, according to a measurement result, of measuring the signal, forwarded by the LTE eNB side.

12. The method according to claim 11, wherein the method further comprises:
    transmitting related configuration of the resource for communicating to the LTE eNB side.

13. The method according to claim 12, wherein the method further comprises:
    communicating with the UE according to the related configuration.

14. An apparatus for communication in LTE and 5G tight interworking, the apparatus comprising a processor and a memory, wherein the processor is configured to read program codes in the memory to perform the method according to claim 9.

* * * * *